(12) United States Patent
Hoff

(10) Patent No.: US 11,213,138 B2
(45) Date of Patent: Jan. 4, 2022

(54) HEADBOARD ASSEMBLY FOR MODULAR BED FRAME

(71) Applicant: Floyd Design, LLC, Detroit, MI (US)

(72) Inventor: Kyle Hoff, Detroit, MI (US)

(73) Assignee: FLOYD DESIGN, LLC., Detroit, MI (US)

( * ) Notice: Subject to any disclaimer, the term of this patent is extended or adjusted under 35 U.S.C. 154(b) by 20 days.

(21) Appl. No.: 16/690,653

(22) Filed: Nov. 21, 2019

(65) Prior Publication Data

US 2020/0170414 A1    Jun. 4, 2020

Related U.S. Application Data

(63) Continuation of application No. PCT/US2018/033752, filed on May 21, 2018.

(60) Provisional application No. 62/509,963, filed on May 23, 2017.

(51) Int. Cl.
    *A47C 19/02*      (2006.01)
    *A47C 19/00*      (2006.01)
    *F16B 12/56*      (2006.01)

(52) U.S. Cl.
CPC .......... *A47C 19/022* (2013.01); *A47C 19/005* (2013.01); *A47C 19/025* (2013.01); *F16B 12/56* (2013.01)

(58) Field of Classification Search
CPC ... A47C 19/022; A47C 19/005; A47C 19/025; A47C 19/021; F16B 12/56; F16B 12/54; F16B 12/60; F16M 13/022; F16M 2200/08; F16M 11/02; F16M 11/16
See application file for complete search history.

(56) References Cited

U.S. PATENT DOCUMENTS

| | | | |
|---|---|---|---|
| 2,080,068 A | | 5/1937 | Weisman |
| 2,995,761 A | * | 8/1961 | Sands .................. A47C 19/022 5/301 |
| 4,067,161 A | | 1/1978 | Rensch |
| 4,160,296 A | | 7/1979 | Fogel |
| 4,429,426 A | * | 2/1984 | Gutner ................. A47C 19/005 5/288 |
| 4,617,689 A | * | 10/1986 | Nelson .................... E05C 19/14 5/400 |
| 4,856,127 A | | 8/1989 | Lenger |

(Continued)

FOREIGN PATENT DOCUMENTS

| | | | | |
|---|---|---|---|---|
| DE | 202015100896 U1 | | 4/2015 | |
| EP | 3015027 A1 | * | 5/2016 | ........... A47C 19/022 |
| FR | 2847782 A1 | * | 6/2004 | ........... A47C 19/021 |

OTHER PUBLICATIONS

International Search Report and Written Opinion re Application No. PCT/US18/33752 dated Aug. 23, 2018; 14 pages.

*Primary Examiner* — Robert G Santos
*Assistant Examiner* — Alison N Labarge
(74) *Attorney, Agent, or Firm* — Foley & Lardner LLP

(57) ABSTRACT

A headboard assembly for a modular bed frame assembly includes a support bracket and a headboard. The support bracket includes an upper attachment structure and a lower attachment structure. The headboard is removably coupled to the support bracket at the upper attachment structure. The support bracket is configured to be removably coupled between two laterally adjacent planar members of the modular bed frame assembly by the lower attachment structure.

20 Claims, 14 Drawing Sheets

(56) References Cited

U.S. PATENT DOCUMENTS

| | | | |
|---|---|---|---|
| 6,546,401 B1 * | 4/2003 | Iizuka | G06F 40/284 |
| 6,564,401 B1 * | 5/2003 | Weinman | A47C 19/022 |
| | | | 5/132 |
| 2006/0195983 A1 * | 9/2006 | Polevoy | F16B 12/56 |
| | | | 5/288 |
| 2007/0256239 A1 * | 11/2007 | Cliche | A47C 19/022 |
| | | | 5/279.1 |
| 2017/0135491 A1 * | 5/2017 | Hoff | A47C 19/024 |
| 2017/0314732 A1 * | 11/2017 | Minn | B60R 11/0252 |

* cited by examiner

HEADBOARD ASSEMBLY FOR MODULAR BED FRAME

CROSS-REFERENCE TO RELATED PATENT APPLICATIONS

This application is a Continuation of International Application No. PCT/US2018/033752, filed May 21, 2018, which claims the benefit of and priority to U.S. Provisional Application No. 62/509,963, filed May 23, 2017. The entire disclosures of the foregoing applications are hereby incorporated by reference herein.

BACKGROUND

The present application relates generally to the field of headboard assemblies. More specifically, this application relates to a headboard assembly that is easy to assemble and disassemble and can be used with a modular bed frame assembly.

It would be advantageous to provide a headboard assembly for supporting an occupant on a bed on a modular bed frame that includes a relatively few number of components and is easy to assemble and disassemble.

SUMMARY

One embodiment relates to a headboard assembly for a modular bed frame assembly. The headboard assembly includes a support bracket and a headboard. The support bracket includes an upper attachment structure and a lower attachment structure. The headboard is removably coupled to the support bracket at the upper attachment structure. The support bracket is configured to be removably coupled between two adjacent planar members of the modular bed frame assembly by the lower attachment structure.

Another embodiment relates to a support bracket for a headboard assembly for a modular bed frame assembly. The support bracket includes an upper attachment structure and a lower attachment structure. The upper attachment structure is configured to receive a headboard to define the headboard assembly. The lower attachment structure is configured to be inserted between two adjacent planar members of the modular bed frame assembly, so as to receive a portion of each of the two adjacent planar members and removably couple the support bracket to the modular bed frame assembly.

Yet another embodiment relates to a method of assembling a headboard assembly to a modular bed frame assembly. The method comprises inserting a support bracket between two adjacent planar members of the modular bed frame assembly, wherein the support bracket includes a lower attachment structure configured to receive a portion of each of the two adjacent planar members. The method further comprises inserting a headboard into an upper attachment structure of the support bracket.

In some exemplary embodiments, the support bracket further includes a connecting structure extending between the upper attachment structure and the lower attachment structure.

In some exemplary embodiments, the upper attachment structure defines a generally C-shaped section for receiving a portion of the headboard.

In some exemplary embodiments, the upper attachment structure includes an opening for receiving a fastener to couple the headboard to the support bracket.

In some exemplary embodiments, the upper attachment structure is configured to be oriented at an angle of approximately 0-25 degrees relative to a plane defined by the two adjacent planar members of the modular bed frame assembly.

In some exemplary embodiments, the lower attachment structure includes a first C-shaped section configured to receive a portion of one of the two adjacent planar members of the modular bed frame assembly.

In some exemplary embodiments, the lower attachment structure includes a second C-shaped section extending outwardly away from the first C-shaped section, wherein the second C-shaped section is configured to receive a portion of the other of the two adjacent planar members of the modular bed frame assembly.

In some exemplary embodiments, the lower attachment structure includes a friction member configured to limit relative movement between the support bracket and the two adjacent planar members.

DETAILED DESCRIPTION

Figure 1:
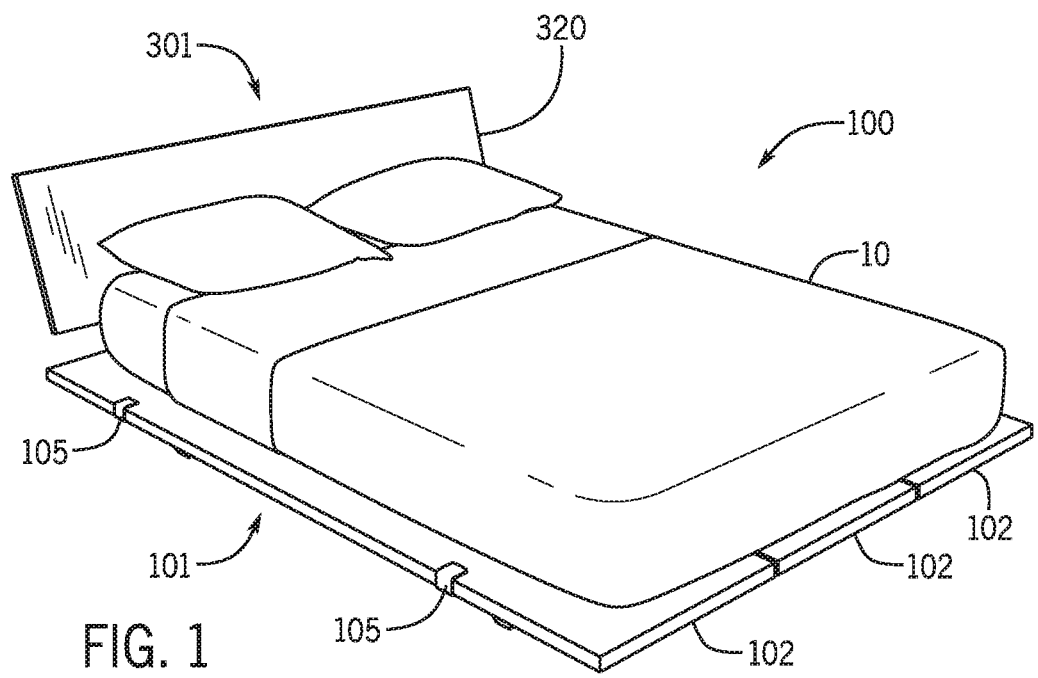
FIG. 1 is a perspective view of a bed assembly including a bed frame assembly and a headboard assembly, according to one embodiment.
Figure 2:
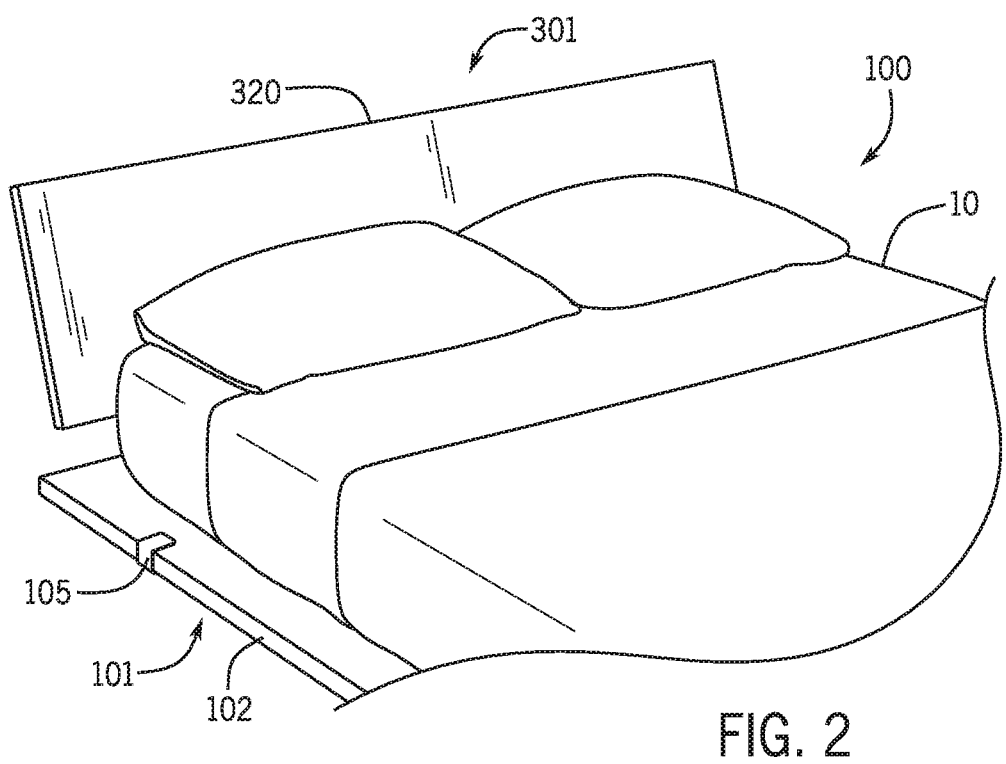
FIG. 2 is a perspective view of a portion of the bed assembly of FIG. 1.

Referring generally to the figures, disclosed herein is a headboard assembly that has relatively few components (e.g., elements, members, etc.), is easy to assemble and disassemble, and is removably coupled to a modular bed frame assembly.

As shown in FIGS. 1-8, an exemplary embodiment of a bed assembly 100 is shown. The bed assembly 100 includes a modular bed frame assembly 101 (as described further herein), a headboard assembly 301 (also described further herein), and a mattress 10.

The mattress 10 is positioned on top of the bed frame assembly 101 and next to or adjacent to the headboard assembly 301. The mattress 10 may be configured according to be any known size (e.g., twin, full, double, queen, king, etc.) and/or arrangement. It is understood that the mattress may be positioned directly on top of the bed frame assembly 101 or a box spring may be positioned on directly on top of the bed frame assembly 101 and the mattress is positioned directly on top of the box spring.

As shown in FIGS. 1-8, the modular bed frame assembly 101 is configured to support the mattress 10 disposed on top of the bed frame assembly 101. According to other exemplary embodiments, the bed frame assembly 101 may be configured as a support for other types of elevated surfaces or members, such as platforms, stages, or the like. Further, it should be noted that although FIGS. 1-8 illustrate one specific type of bed frame assembly, those reviewing the present disclosure will appreciate that the headboard assembly as discussed herein may be used with other types of bed frame assemblies other than that specifically shown and described in the present application.

The bed frame assembly 101 includes one or more planar members 102 that directly support the mattress 10, at least two bed frame brackets 105 removably coupled to and directly supporting the one or more planar members 102, and at least one connecting member (e.g., a tensioning member, a strap (e.g., a ratchet strap, a non-adjustable strap, a cable strap, etc.), a cable, a rod (e.g., a threaded rod), etc.) that is configured to secure the bed frame assembly 101 (and specifically sure the bed frame brackets 105 to the planar members 102) together, such as by securing two or more bed frame brackets 105 to the one or more planar members 102.

Figure 9:
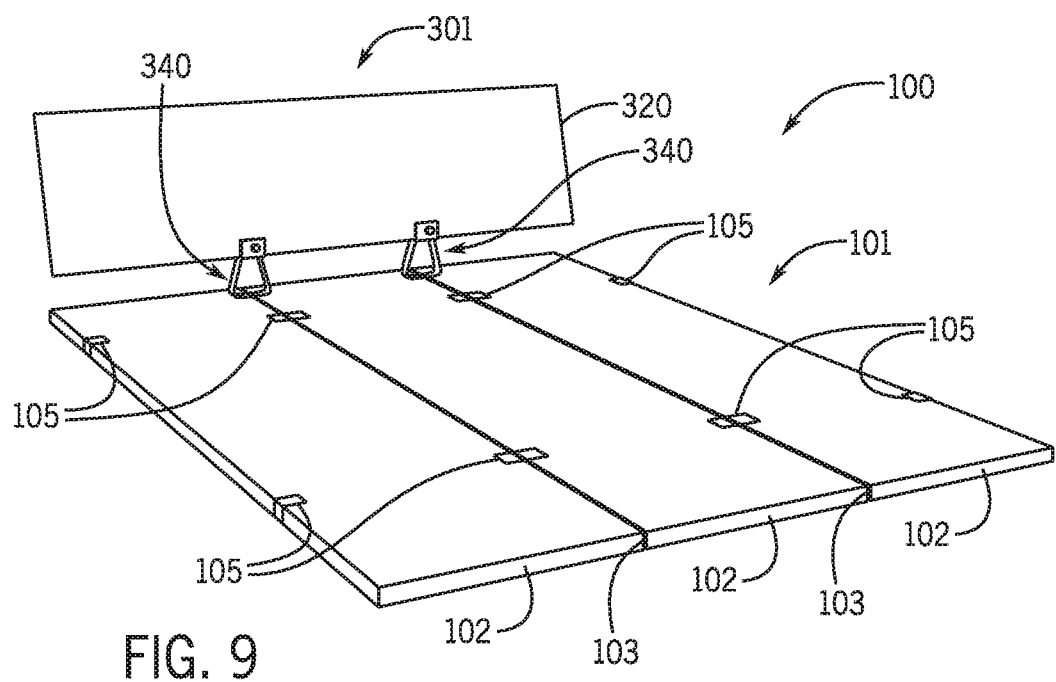
FIG. 9 is a perspective view of the bed frame assembly and the headboard assembly of the bed assembly of FIG. 1.
Figure 10:
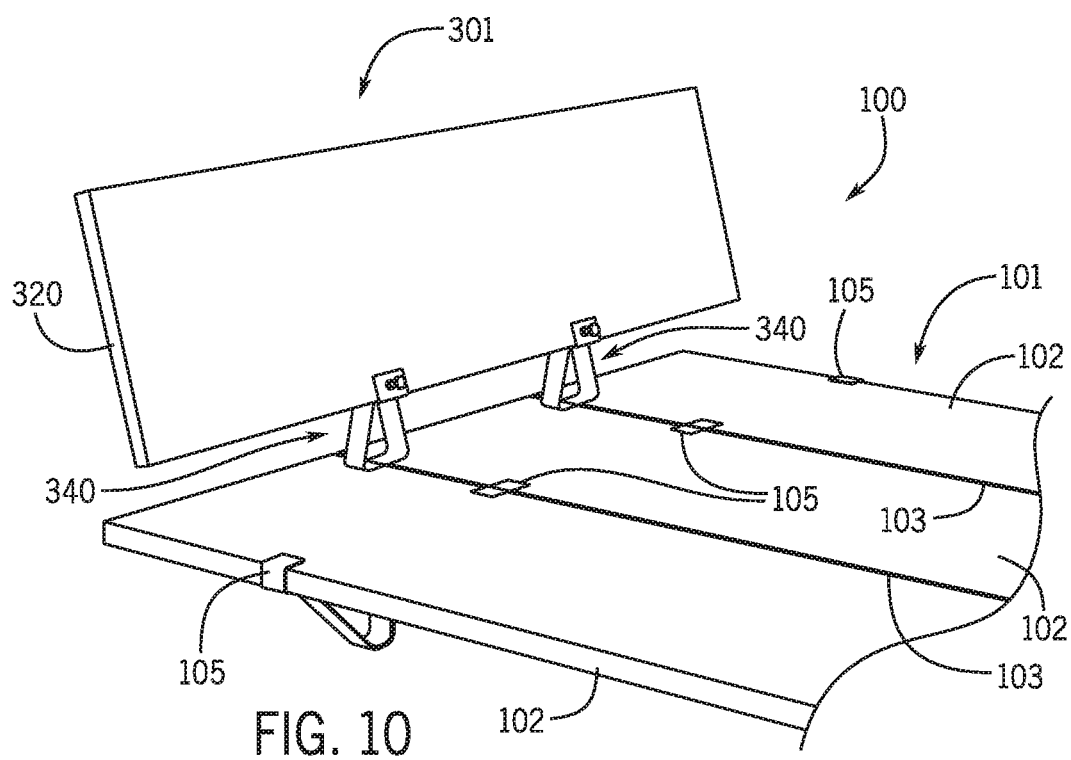
FIG. 10 is a perspective view of a portion of the bed frame assembly and the headboard assembly of the bed assembly of FIG. 1.

To allow the size of the bed frame assembly 101 to be changed according to the desired size, the bed frame assembly 101 is modular in nature. For example, the bed frame assembly 101 can be configured (or reconfigured) to include any number of planar members 102, depending on the desired size of the bed frame assembly 101 and to accommodate different sized beds 10 (e.g., twin, full, double, queen, king, etc.). For example, a bed frame assembly 101 can be configured to include two planar members 102 (e.g., two 22 inch wide planar members 102) arranged in a side by side manner to allow the bed frame assembly 101 to be sized to support a twin-sized bed (e.g., mattress, box spring, etc.). The bed frame assembly 101 can be reconfigured, for example, to include three planar members 102 arranged in a side-by-side manner, as shown in FIGS. 9-10, to be used with a queen-sized bed.

Thus, one or more additional planar members 102 and associated hardware (e.g., bed frame brackets 105) could be added to the original bed frame assembly 101 to convert the bed frame assembly 101 from a twin bed frame to a queen bed frame (or to any other sized bed frame). Moreover, due to the simplicity of the assembly process, a skilled artisan is not required to assemble and/or disassemble the bed frame assembly 101. Additionally, the bed frame assembly 101 may be designed such that the bed frame assembly 101 may be disassembled and reassembled without the use of conventional tools (e.g., screw drivers, ratchets, sockets, etc.).

With the bed frame assembly 101, two planar members 102 are positioned next to each other and coplanar with each other. Accordingly, as shown in FIGS. 9-14, a gap or slot 103 is formed between the two planar members 102 along respective edges of each of the planar members 102 that are closest to each other. The bed frame brackets 105 of the bed frame assembly 101 and/or the support brackets 340 of the headboard assembly 301 may extend through or within the slot 103 and between two planar members 102.

Each panel or planar member 102 may be configured the same, similar to, or different from any other planar member 102. For example, each planar member 102 may have the same shape. As shown in FIG. 9, each planar member 102 has a generally cuboidal shape (e.g., a rectangular planar member, a rectangular cuboid shape, etc.), with a length greater than a width, which is greater than a thickness. Each planar member 102 may have other suitable shapes, such as other polyhedron shapes. Also for example, each planar member 102 may be configured having the same size (e.g., thickness, width, and/or length) in order to provide modularity to the bed frame assembly 101. According to one non-limiting example, each planar member 102 is approximately 1.5 inches thick, about 22 inches wide, and 87 inches long. It is noted that these dimensions, as well as any others disclosed in this application, denote examples only and are not limiting.

Each planar member 102 may be made from any suitable material that is strong enough to withstand the loading during use. According to one example, each planar member 102 is a panel made from a sheet of material having a plurality of layers (e.g., piles, etc.), such as a plywood. Each planar member 102 may include more than one sheet of material, such as multiple sheets of plywood. According to another example, each planar member 102 includes a honeycomb material to advantageously provide a relatively lighter weight planar member (e.g., compared to a sheet of material). According to other exemplary embodiments, each planar member 102 includes slats, an open frame design, or the like.

The bed frame brackets 105 support the planar members 102, such as, for example, by resting on a support surface, such as a floor (or other surface), and having the planar members 102 rest on the bed frame brackets 105. As shown in FIGS. 3-5, 7, and 10, the bed frame brackets 105 are disposed substantially underneath the planar members 102.

Figure 4:
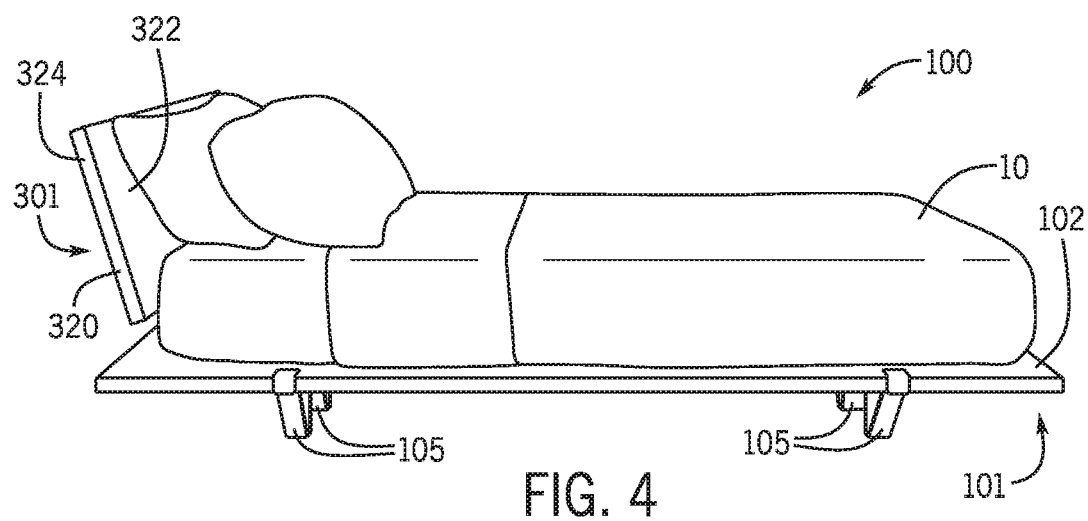
FIG. 4 is a side view of the bed assembly of FIG. 1.
Figure 5:
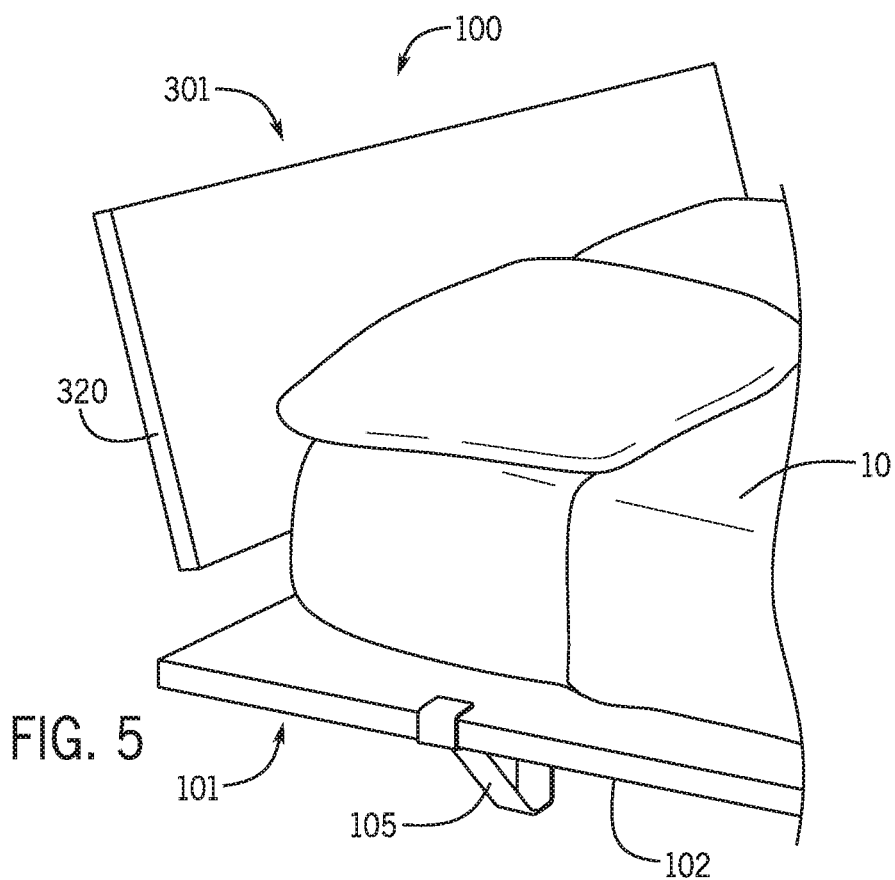
FIG. 5 is a perspective view of a portion of the bed assembly of FIG. 1.
Figure 6:
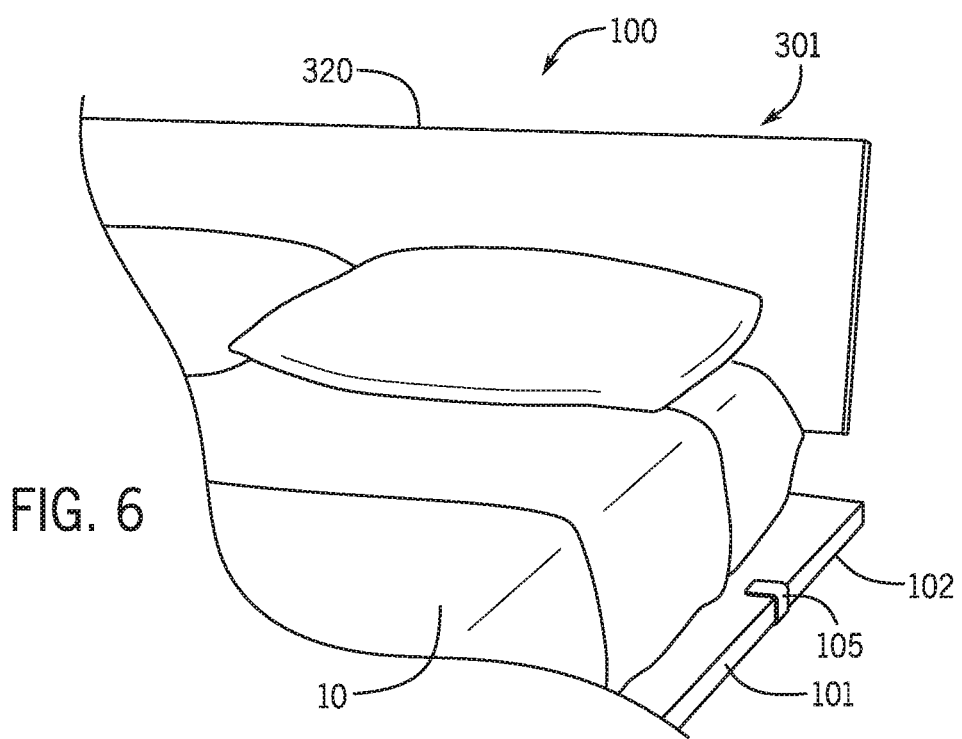
FIG. 6 is a perspective view of a portion of the bed assembly of FIG. 1.
Figure 7:
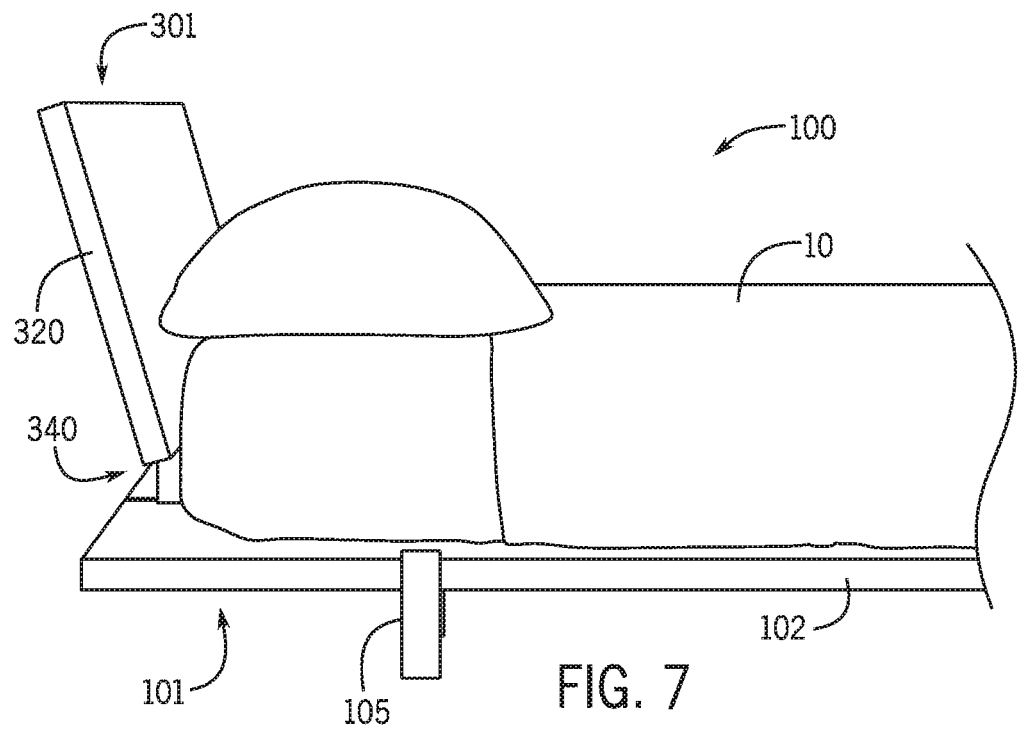
FIG. 7 is a side view of a portion of the bed assembly of FIG. 1.

As shown in FIG. 4, the bed frame brackets 105 include at least one end bracket and/or at least one center bracket, depending on the number of planar members 102 the bed frame assembly 101 includes. The end brackets may be coupled to and extend around an outer side of the planar members 102. The center bracket may be disposed between an inner side of each of the two planar members 102 to couple the two planar members 102 together. Accordingly, for example, if the bed frame assembly 101 is configured to include at least three planar members 102 arranged in a side by side configuration, a first end bracket may be coupled to an outer side of one of the outer planar members 102 and a second end bracket may be coupled to an outer side of the other outer planar member 102. A first center bracket may be provided between inner sides of the first and second adjacent planar members 102 to interconnect the first and second adjacent planar members 102, and a second center bracket may be provided between inner sides of the second and third adjacent planar members 102 to couple the second and third adjacent planar members 102. Also, for example, if the bed frame assembly 101 is configured having four planar members 102, then the bed frame assembly 101 may be configured having two end brackets and three center brackets, and so forth.

Each end bracket is configured to be removably coupled to an open end (e.g., an end that is not adjacent to or abutting another planar member 102) of one planar member 102 to support the one or more planar members 102 of the bed frame assembly 101. Each center bracket is configured to be removably coupled between two adjacent planar members 102 to support the two planar members 102 of the bed frame assembly 101. In other words, each center bracket is configured to be coupled to a closed end (e.g., the end adjacent to an end of another planar member) of each of two adjacent planar members 102.

Figure 11:
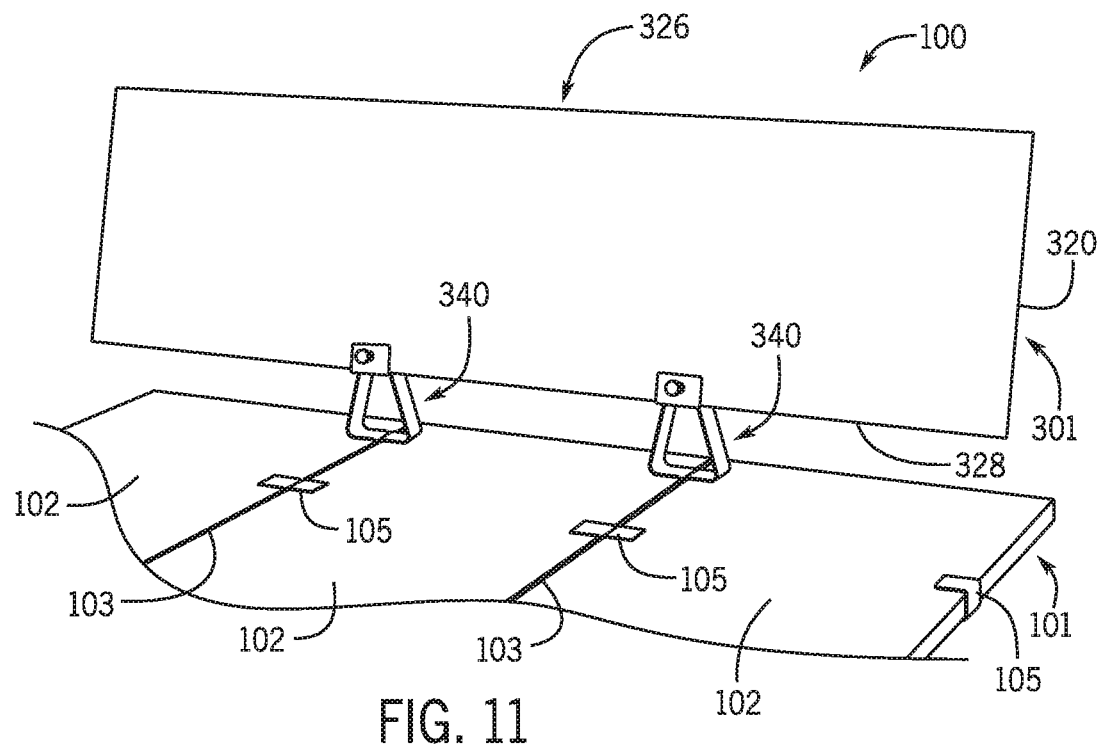
FIG. 11 is a perspective view of the bed frame assembly and the headboard assembly of the bed assembly of FIG. 1.
Figure 12:
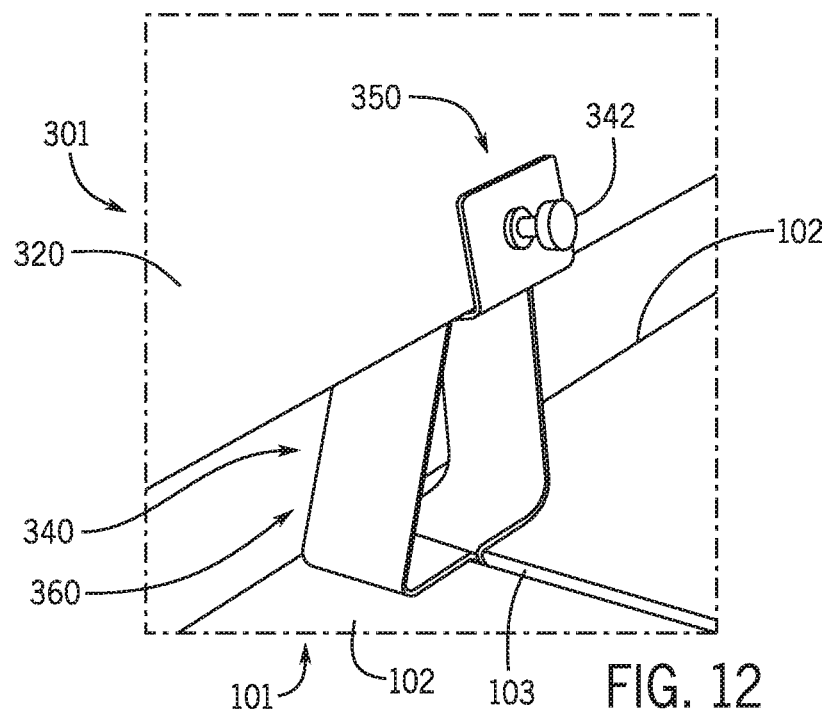
FIG. 12 is a close-up, perspective view of a support bracket of the headboard assembly of the bed assembly of FIG. 1.

As shown in FIGS. 1-8, the headboard assembly 301 is configured to be positioned behind or next to the mattress 10. The headboard assembly 301 is configured and sized to extend above the mattress (of the mattress 10) in order to provide an area for the user to lean against or to rest various bed accessories (e.g., the pillows) against (as shown in FIG. 4). As shown in FIGS. 9-11, the headboard assembly 301 is removably coupled to the bed frame assembly 101 and is disposed substantially above the bed frame assembly 101. As described further herein, the headboard assembly 301 is configured to be easily assembled and disassembled and easily coupled to and removed from the bed frame assembly 101.

As shown in FIGS. 9-11, the headboard assembly 301 includes a headboard 320 to support the occupant and/or bed accessories and at least one support bracket 340 removably coupled to the headboard 320 and the bed frame assembly 101 and directly supporting the headboard 320, as described further herein.

The panel or headboard 320 may be configured the same as, similar to, or different from the planar members 102 of the bed frame assembly 101. For example, the planar member 102 and the headboard 320 may have the same shape. As shown in FIGS. 9-11, the headboard 320 has a generally cuboidal shape (e.g., a rectangular planar member, a rectangular cuboid shape, etc.), with a length greater than a width, which is greater than a thickness. The headboard 320 may have other suitable shapes, such as other polyhedron shapes. According to various exemplary embodiments, the headboard 320 may be substantially planar or substantially non-planar, and may include planar or non-planar portions. According to one non-limiting example, the headboard 320 is approximately 1.5 inches thick, about 22 inches wide, and 87 inches long. It is noted that these dimensions, as well as any others disclosed in this application, denote examples only and are not limiting.

Similar to the planar members 102 of the bed frame assembly 101, the headboard 320 may be made from any suitable material that is strong enough to withstand the loading during use (e.g., wood, metals, polymers, composite materials, etc.). According to one example, the headboard 320 is a panel made from a sheet of material having a plurality of layers (e.g., piles, etc.), such as a plywood. The headboard 320 may include more than one sheet of material, such as multiple sheets of plywood. According to another example, the headboard 320 includes a honeycomb material to advantageously provide a relatively lighter weight headboard (e.g., compared to a sheet of material). According to other exemplary embodiments, the planar member 320 may include slats, an open frame design, or the like.

The planar member 320 may be constructed in a variety of different sizes (i.e., lengths, heights, and thicknesses). The length of the headboards 320, in particular, may be varied according to the size mattress 10 desired and therefore the size of the bed frame assembly 101.

Figure 3:
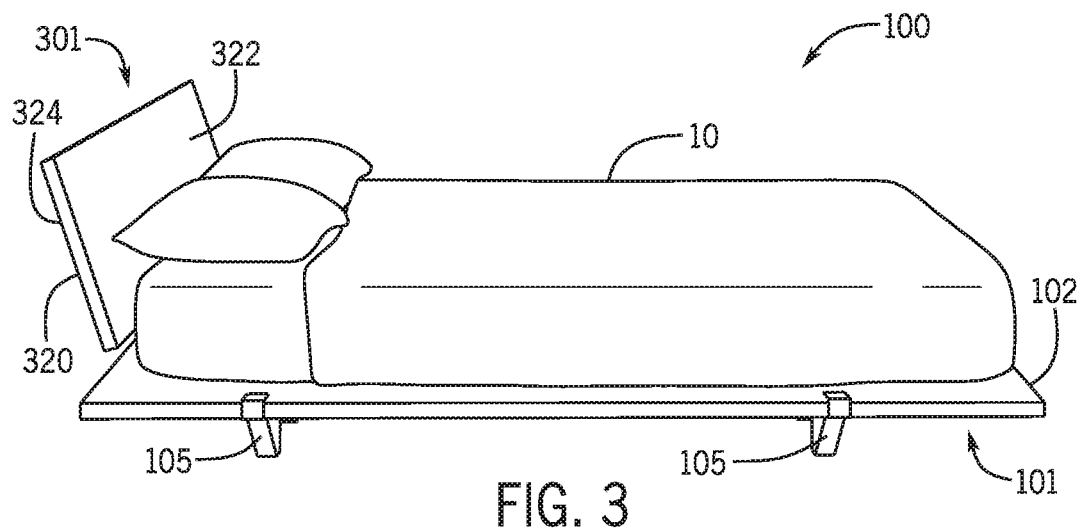
FIG. 3 is a side view of the bed assembly of FIG. 1.

As shown in FIGS. 3-4, the headboard 320 includes a front side 322 and a back side 324 that are opposite each other. The front side 322 is configured to be positioned closer toward the mattress 10 and the back side 324 is configured to be positioned relatively further from the mattress 10. Accordingly, the user can lean up or rest against the front side 322 of the planar member 320 or rest bed accessories (such as pillows) against the front side 322 of the planar member 320 while the back side 324 of the planar member 320 may, for example, face a wall.

Figure 8:
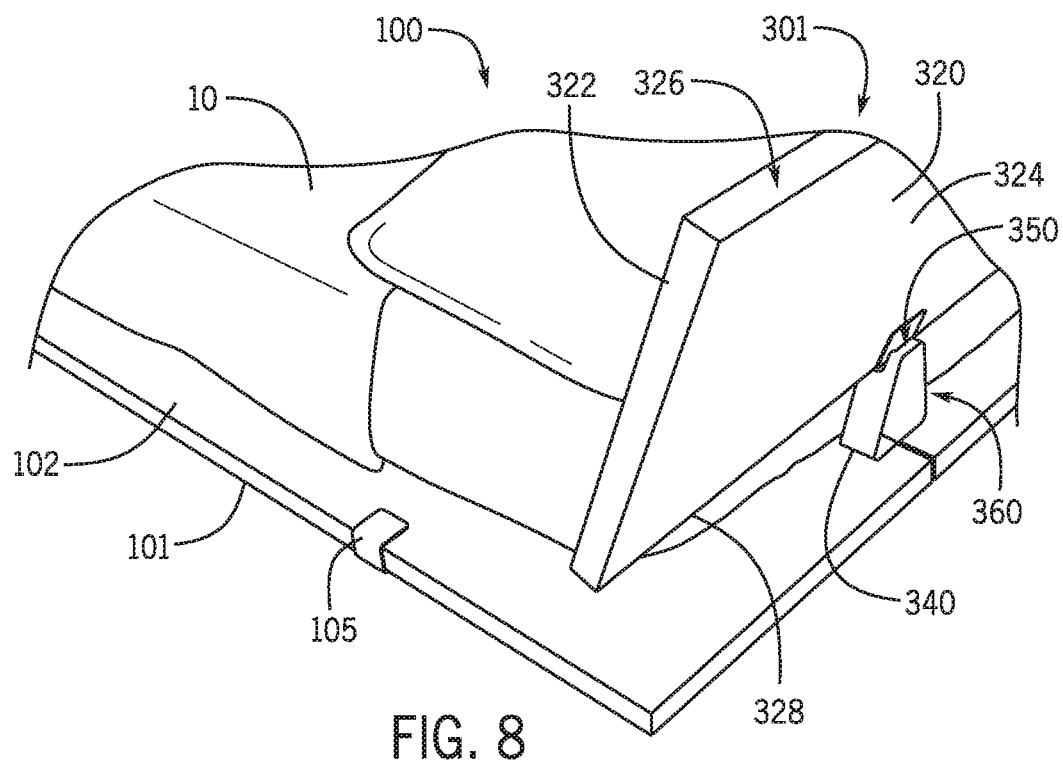
FIG. 8 is a rear, perspective view of a portion of the bed assembly of FIG. 1.

As shown in FIGS. 8 and 11, the planar member 320 may also include an outer edge 326 that extends around the entire periphery of the planar member 320 between the front side 322 and the back side 324. The outer edge 326 includes an upper edge, two side edges, and a lower edge 328. The lower edge 328 is closest to the planar members 102 of the bed frame assembly 101 relative to the upper edge of the headboard 320.

As shown in FIGS. 9-14, the support brackets 340 support the headboard 320 by, for example, holding the headboard 320 in position. The support brackets 340 also removably couple the headboard 320 to the bed frame assembly 101. Accordingly, the support brackets 340 are substantially disposed between the headboard 320 and the bed frame assembly 101.

The headboard assembly 301 may include a plurality of support brackets 340 positioned along the length of the headboard 320. The number of support brackets 340 may directly coincide with the number of planar members 102 that the bed frame assembly 101 includes. For example, the headboard assembly 301 may include one support bracket 340 less than the number of planar members 102 that the bed frame assembly 101 includes, because each support bracket 340 is configured to be inserted between two planar members 102 of the bed frame assembly. Accordingly, if the bed frame assembly 101 includes three planar members 102 arranged side-by-side, the headboard assembly 301 includes two support brackets 340 inserted between two adjacent planar members 102. According to other exemplary embodiments, the number of support brackets may differ from that shown in the accompanying figures.

As shown in FIGS. 15-20, each of the support brackets 340 includes an upper attachment structure 350, a connecting structure 360, and a lower attachment structure 380. The upper attachment structure 350 is configured to removably couple to the headboard 320 of the headboard assembly 301. The lower attachment structure 380 is configured to removably couple to the planar members 102 of the bed assembly 100. The connecting structure 360 extends between and connects the upper attachment structure 350 and the lower attachment structure 380 together.

Figure 16:
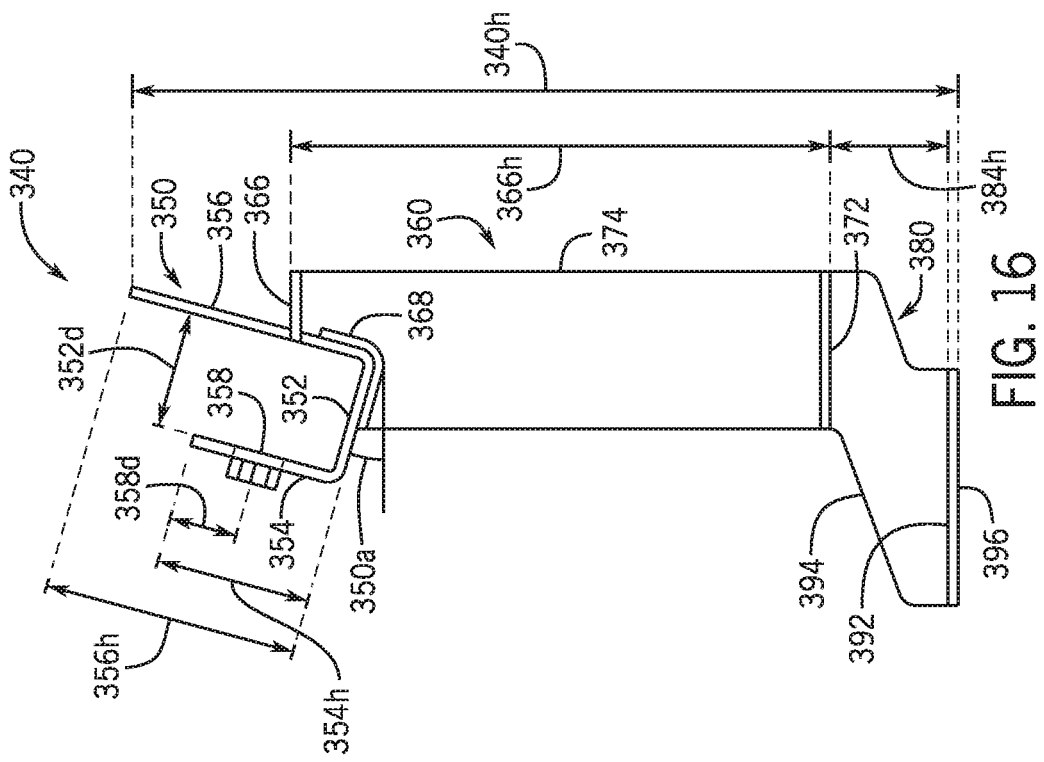
FIG. 16 is a side view of the support bracket of FIG. 15.
Figure 18:
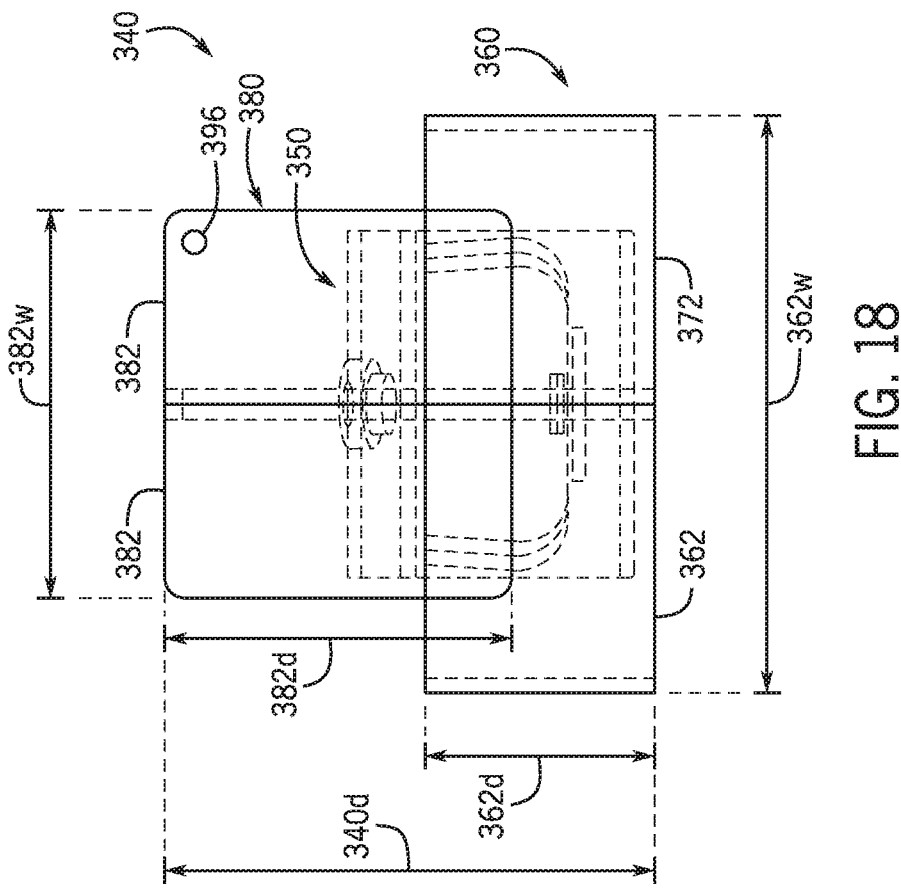
FIG. 18 is a bottom view of the support bracket of FIG. 15.

The total height 340h of the entire support bracket 340 (as shown in FIG. 16) may be approximately 10.67 inches according to an exemplary embodiment. The total depth 340d of the entire support bracket 340 (as shown in FIG. 18)

may be approximately 4.25 inches according to an exemplary embodiment. The total width of the entire support bracket 340 is equal to the width of the widest portion of the support bracket 340, which may be the width 362w of both of the lower members 362, 372 of the connecting structure, as described further herein. Of course, such dimensions may differ according to other exemplary embodiments.

As shown in FIGS. 8 and 12-14, the upper attachment structure 350 of the support bracket 340 couples directly to the headboard 320 of the headboard assembly 301 and is configured to receive and retain a lower edge 328 or portion of the headboard 320. To couple and secure to the headboard 320, the upper attachment structure 350 extends around a portion of the lower edge 328 of the headboard 320 and extends between the front side 322 and the back side 324 of the headboard 320. The entire upper attachment structure 350 is positioned at an angle (relative to a plane defined by a top surface of the planar members 102 of the bed frame assembly 101) to position the headboard 320 at an angle relative to the planar members 102 such that a more comfortable support position for the user is provided by the headboard 320. For example, the angle 350a of the upper attachment structure 350 may be approximately 0-25° relative to the plane defined by the planar members 102 according to an exemplary embodiment. According to another exemplary embodiment, the upper attachment structure 350 may be adjustable to allow for selective angular positioning of the headboard 320 relative to the planar members 102. In this manner, a user can position the headboard at a desired angular position.

Figure 15:
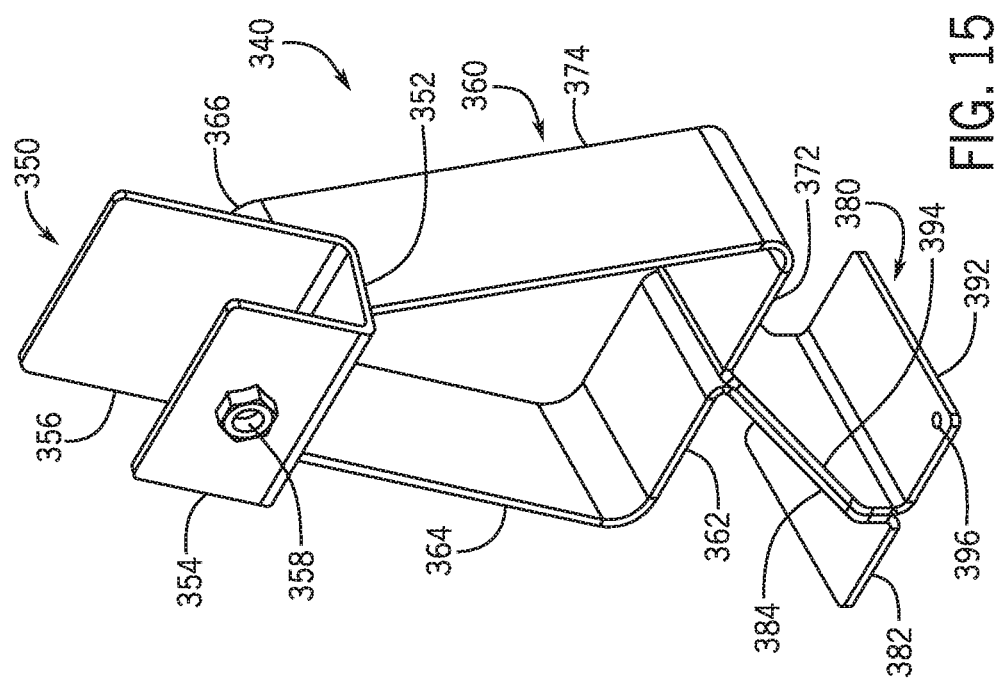
FIG. 15 is a perspective view of a support bracket of the headboard assembly of the bed assembly of FIG. 1.
Figure 17:
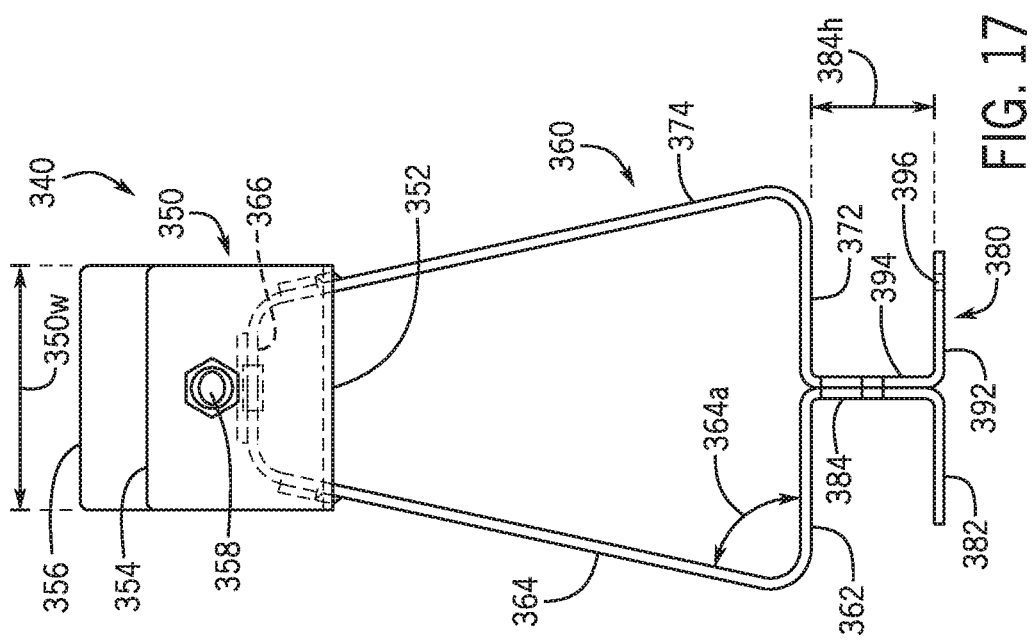
FIG. 17 is a front view of the support bracket of FIG. 15.
Figure 19:
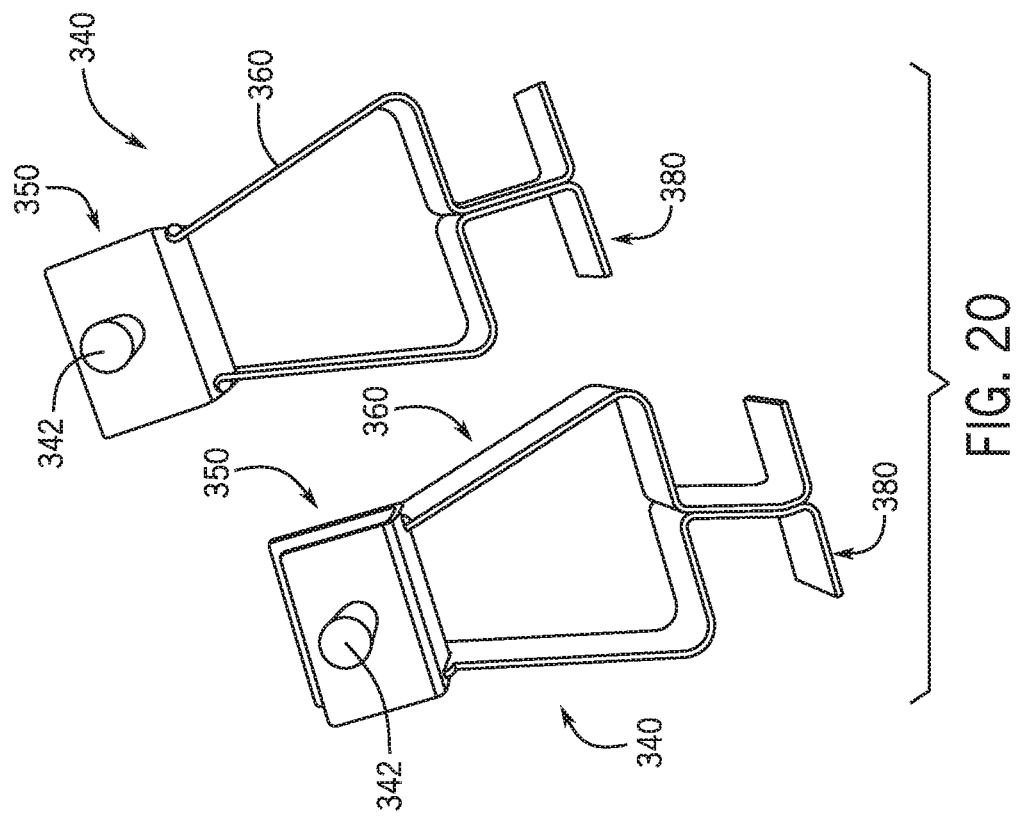
FIG. 19 is a perspective view of support brackets of the headboard assembly of the bed assembly of FIG. 1.
Figure 20:
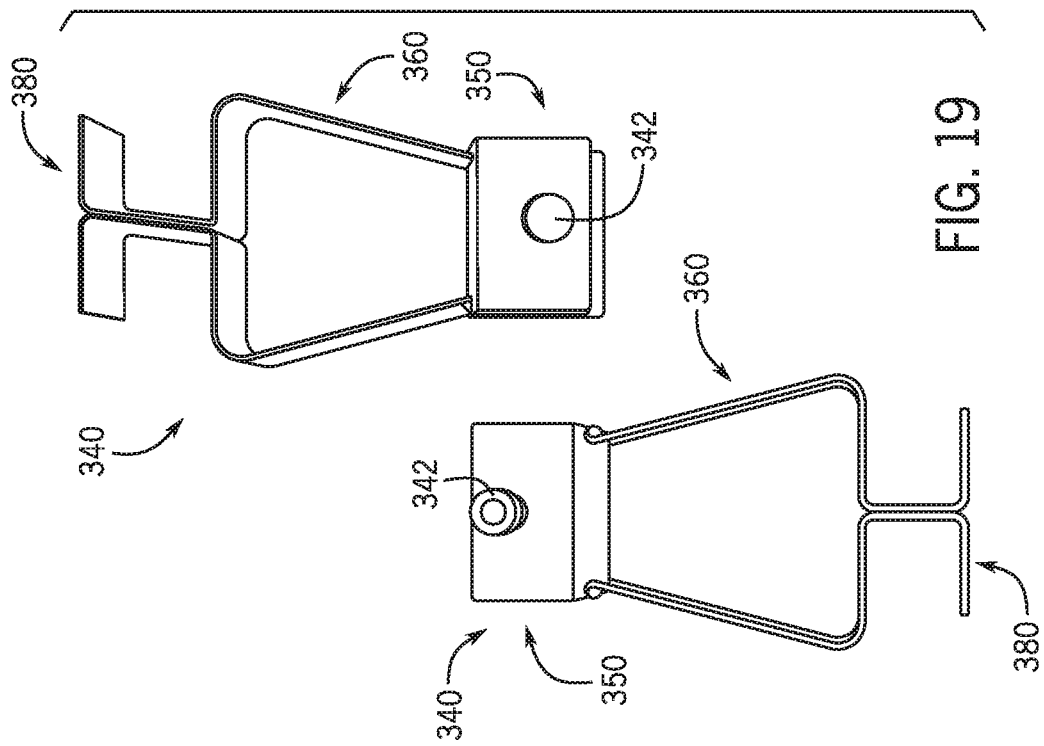
FIG. 20 is a perspective view of support brackets of the headboard assembly of the bed assembly of FIG. 1.

As shown in FIGS. 15-17, the upper attachment structure 350 includes a support base 352, a first extension 354, and a second extension 356. The first extension 354 and the second extension 356 extend from opposite ends of the support base 352 and are each substantially perpendicular to the support base 352. Thus, the upper attachment structure 350 (with the support base 352, the first extension 354, and the second extension 356) defines a generally C-shaped (e.g., C-shape with curved or rounded corners, C-shape with square corners, U-shape, etc.) section that is configured to receive and help retain a portion of a side or end of the headboard 320. According to an exemplary embodiment, the portion or end of the headboard 320 includes a feature that is complementary to the C-shaped section (e.g., a notch, insert, plate, board, etc.), and is configured to be received by or mate with the C-shaped section, so as to act as a poke-a-yoke for locating the headboard 320 and/or to eliminate the need for a fastener to couple the upper attachment structure 350 to the headboard 320 (e.g., bolt, etc.). This C-shape also helps couple the support bracket 340 and the headboard 320 together. According to an exemplary embodiment, the C-shaped section has a size and inner profile that is complementary to an outer profile of the headboard 320, such that at least a portion of the headboard 320 can be received and retained within the C-shaped section. According to other exemplary embodiments, the C-shaped section can be configured having a different size and profile to receive other sized planar members (e.g., planar members having different thicknesses, different shapes, etc.). According to other exemplary embodiments, the extensions 354, 356 may be adjustable relative to the support base 352 such that the C-shaped section can receive a variety of different sized planar members (e.g., planar members having different thicknesses, etc.).

As shown in FIG. 17, the width 340w of each of the support base 352, the first extension 354, and the second extension 356 may be approximately the same. The width 350w of the upper attachment structure 350 may be approximately 3 inches according to an exemplary embodiment, although this may vary according to other exemplary embodiments.

The support base 352 is a generally flat member that is configured to extend around, abut, and support the lower edge 328 along a portion of the length of the lower edge 328 of the headboard 320. Accordingly, the depth 352d of the support base 352 (which is equal to the distance between the first extension 354 and the second extension 356) is approximately the thickness of the headboard 320. The depth 352d of the support base 352 may be approximately 1.5 inches according to an exemplary embodiment.

The first extension 354 is configured to extend along the front side 322 of the headboard 320 and the second extension 356 is configured to extend along the back side 324 of the headboard 320 such that a portion of the headboard 320 is sandwiched between the first extension 354 and the second extension 356. The first extension 354 and the second extension 356 are substantially parallel to each other and to the front side 322 and the back side 324 of the headboard 320.

As shown in FIGS. 16-17, the second extension 356 may be higher or taller than the first extension 354 such that the second extension 356 extends above the first extension 354 and extends further along the back side 324 of the headboard 320 than the first extension 354 extends along the front side 322 of the headboard 320. As shown in FIG. 16, the height 356h of the second extension 356 may be approximately 3.25 inches and the height 354h of the first extension 354 may be less than 3.25 inches according to an exemplary embodiment.

The upper attachment structure 350 may optionally further include a hole, opening, or aperture 358, a nut 359, and a fastener 342 in order to aid in coupling of the support bracket 340 to the headboard 320 by inserting the fastener 342 into the upper attachment structure 350. The aperture 358 provides an area for the fastener 342 (as shown in FIGS. 12-14 and 19-20) to be moved at least partially through the aperture 358 and abut the front side 322 or the back side 324 of the headboard 320. The end of the fastener 342 may press against the headboard 320, which presses the headboard 320 against one of the first extension 354 and the second extension 356 and further secures the headboard 320 within the upper attachment structure 350 of the support bracket 340 (between the first extension 354 and the second extension 356). The fastener 342 may be a bolt or a screw, or may be a different type of fastener according to other exemplary embodiments.

The nut 359 may be positioned around the opening of the aperture 358 in order to provide an area for the fastener 342 to screw into in order to attach the fastener 342 to the support bracket 340.

The aperture 358 may be defined by at least one of the first extension 354 and/or the second extension 356 and extends completely through the first extension 354 or the second extension 356. As shown in FIGS. 15-17, the first extension 354 defines the aperture 358. The aperture 358 may be positioned along the height of the first extension 354. According to one embodiment, distance 358d between the top of the first extension 354 and the middle of the aperture 358 may be approximately 0.88 inches.

As shown in FIGS. 15-17, the connecting structure 360 of the support bracket 340 extends between and connects the upper attachment structure 350 and the lower attachment structure 380 together. Accordingly, the connecting structure 360 is attached to, or integrally formed with, a lower portion of the upper attachment structure 350 and an upper portion of the lower attachment structure 380.

Figure 21:
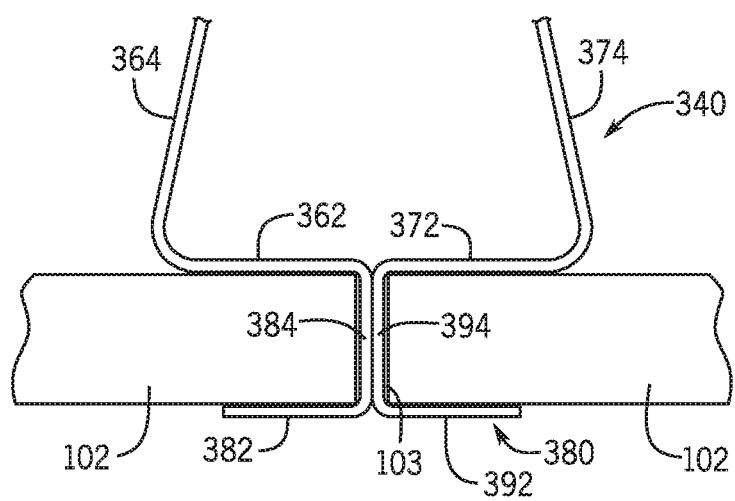
FIG. 21 is a front view of a portion of the support bracket of the headboard assembly of the bed assembly of FIG. 1 assembled to the bed frame assembly of the bed assembly of FIG. 1.

The connecting structure 360 includes a first lower member 362, a second lower member 372, a first extension 364, a second extension 374, an upper member 366 and a notch 368. The first base or lower member 362 and the second base or lower member 372 are configured to extend along a portion of the top surface of two adjacent planar members 102 of the bed frame assembly 101 (as shown in FIG. 21) and support the rest of the connecting structure 360 and the upper attachment structure 350. Accordingly, the first lower member 362 and the second lower member 372 are positioned adjacent to each other and coplanar (e.g., aligned with each other along the same plane), which advantageously aligns the two adjacent planar members 102 to the same height or elevation. The first lower member 362 and the second lower member 372 each extend substantially parallel to a top surface of the planar member 102 of the bed frame assembly 101. As shown in FIG. 17, the first lower member 362 and the second lower member 372 extend away from each other from a central axis of the support bracket 340.

According to an exemplary embodiment, the width 362$w$ of both of the lower members 362, 372 may be approximately 5 inches, and the depth 362$d$ of one of the lower members 362, 372 may be approximately 2 inches.

The first extension 364 and the second extension 374 each extend in an upward manner from the outer edges of each of the first lower member 362 and the second lower member 372, respectfully. As shown in FIG. 17, the first extension 364 and the second extension 374 may each extend at an angle relative to the first lower member 362 and the second lower member 372 and may extend inwardly toward each other. For example, the angle 364$a$ of the first extension 364 relative to the first lower member 362 (which may be the same as the angle of the second extension 374 relative to the second lower member 372) may be approximately 50-70° according to an exemplary embodiment.

The first extension 364 and the second extension 374 may each converge onto respective ends of the upper member 366. The upper member 366 may be substantially parallel to each of the first lower member 362 and the second lower member 372 and may be shorter than the first lower member 362 and the second lower member 372 together since the first extension 364 and the second extension 374 are each angled inwardly. The upper member 366 (and an upper portion of each of the first extension 364 and the second extension 374) may be positioned behind and directly supporting the upper attachment structure 350. The distance 366$h$ between the upper member 366 and each of the lower members 362 and 372 (i.e., the height of the connecting structure 360) may be approximately 7 inches according to an exemplary embodiment.

The connecting structure 360 includes a notch 368 that extends through and along a portion of the upper member 366 and upper portions of each of the first extension 364 and the second extension 374. The notch 368 provides an area to directly support the upper attachment structure 350 and is configured to receive a portion of the upper attachment structure 350. Thus, the size (e.g., width or height, depth, etc.) of the notch 368 may be tailored to the size of the connecting structure 360 to be received by or positioned within the notch 368. The bottom and sides of the notch 368 may be angled in order to position the upper attachment structure 350 at an angle (i.e., at angle 350$a$).

Figure 13:
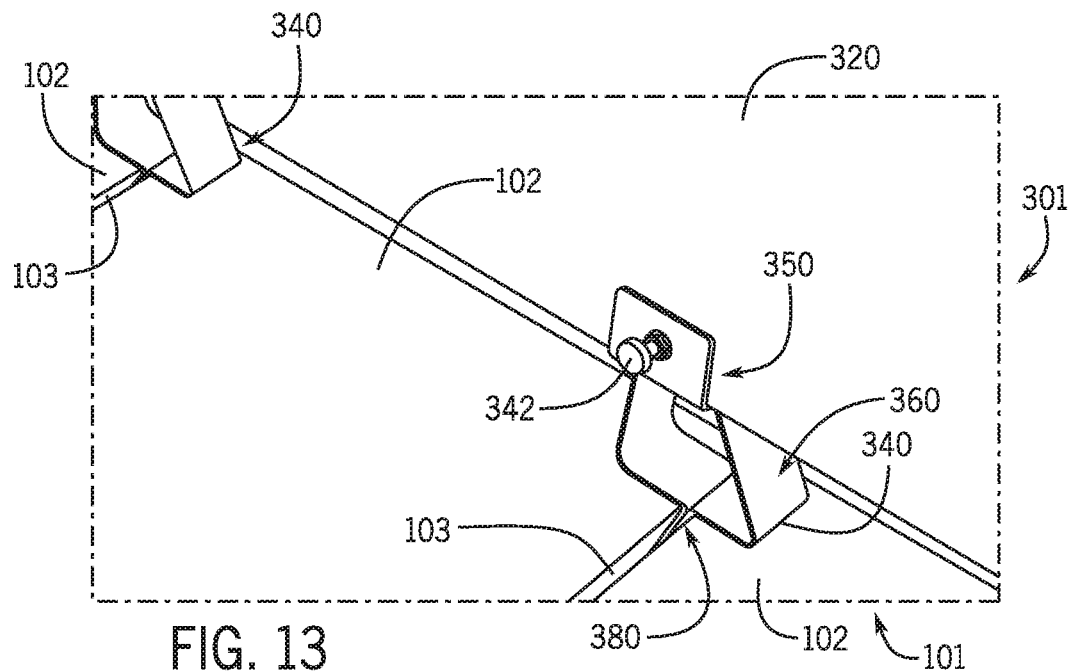
FIG. 13 is a close-up, perspective view of a support bracket of the headboard assembly of the bed assembly of FIG. 1.
Figure 14:
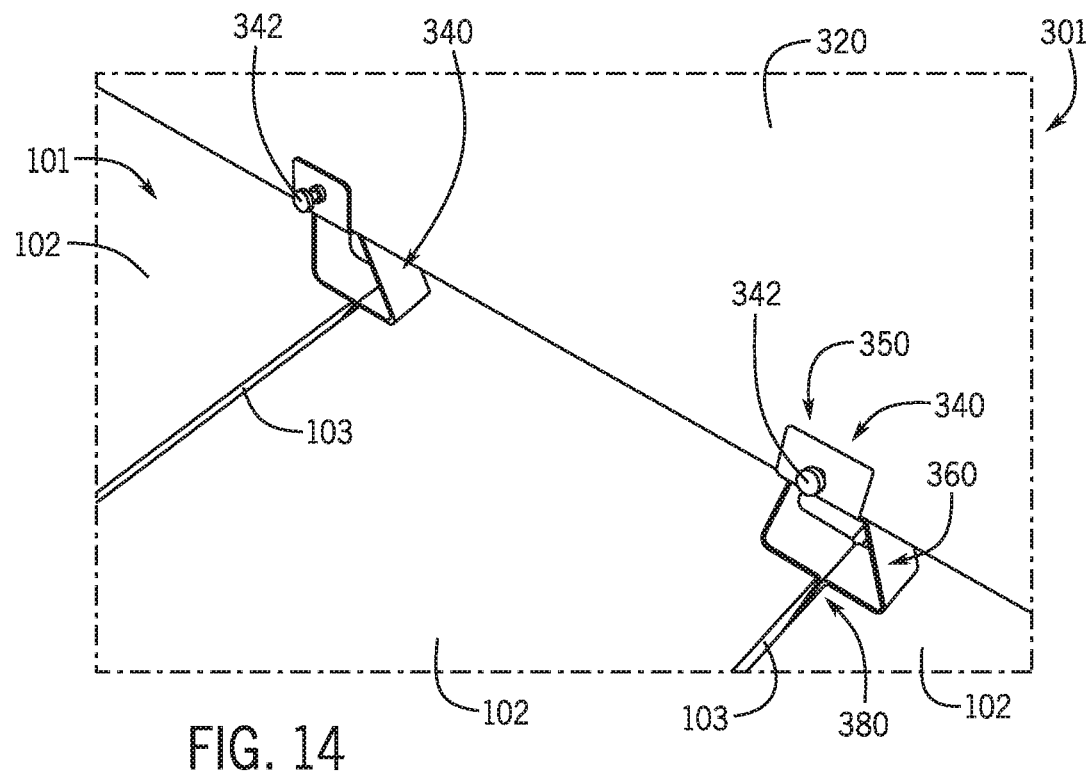
FIG. 14 is a close-up, perspective view of a support bracket of the headboard assembly of the bed assembly of FIG. 1.

As shown in FIGS. 13-14 and 21, the lower attachment structure 380 of the support bracket 340 is configured to directly interface with and couple to the planar member 102 of the bed frame assembly 101. The lower attachment structure 380 includes a first base 382, a second base 392, a first extension 384, and a second extension 394.

As shown in FIG. 21, the first base 382 and the second base 392 are generally flat members that are configured to extend along, abut, and support a portion of the bottom surface (or underside) of two adjacent planar members 102 of the bed frame assembly 101. The first base 382 and the second base 392 are aligned with each other and are positioned adjacent to each other and coplanar (e.g., aligned with each other along the same plane), which advantageously aligns the two adjacent planar members 102 to the same height or elevation. The first base 382 and the second base 392 each extend substantially parallel to a bottom surface of the planar member 102 of the bed frame assembly 101. As shown in FIG. 17, the first base 382 and the second base 392 extend away from each other from a central axis of the support bracket 340. The bases 382, 392 are substantially parallel to the lower members 362, 372. According to an exemplary embodiment, at least one of the first base 382, the second base 392, the first lower member 362, or the second lower member 372 includes a friction member, such as a rubber pad, cork, or other suitable member, material, or coating disposed thereon between the bracket 340 and the planar members 102, so as to limit relative movement between the planar members 102 and the support bracket 340. According to another exemplary embodiment, the first lower member 362 or the second lower member 372 includes a fastener, such as a weld nut, bolt, or other similar type of fastener, for coupling the lower attachment structure 380 to a planar member 102 of the modular bed frame assembly.

As shown in FIG. 18, the width 382$w$ of both of the bases 382, 392 may be less than the width 362$w$ of both of the lower members 362, 372. However, the depth 382$d$ of one of the bases 382, 392 may be greater than the depth 362$d$ of one of the lower members 362, 372. The width 382$w$ of both of the bases 382, 392 may be approximately 3.32 inches according to an exemplary embodiment. The depth 382$d$ of one of the bases 382, 392 may be approximately 3 inches according to an exemplary embodiment.

The first extension 384 and the second extension 394 of the lower attachment structure 380 attach the bases 382, 392 and the lower members 362, 372. The first extension 384 and the second extension 394 may each extend approximately along the central axis of the support bracket 340 directly next to each to and optionally abutting each other. The first extension 384 and the second extension 394 may be substantially perpendicular to the bases 382, 392 and the lower members 362, 372. Accordingly, as shown in FIG. 21, the first extension 384 and the second extension 394 may be configured to be positioned within and extend through the slot 103 such that the extensions 384, 394 are positioned between two planar members 102 of the bed frame assembly 101. Therefore, the extensions 384, 394 are configured to extend along an edge of the planar members 102 of the bed frame assembly 101.

As shown in FIG. 21, the first extension 384 and the second extension 394 space apart the bases 382, 392 and the lower members 362, 372 such that a portion of the planar member 102 of the bed frame assembly 101 can be sandwiched and secured between the bases 382, 392 of the lower attachment structure 380 and the lower members 362, 372 of the connecting structure 360, as shown in FIG. 21. Thus, the first lower member 362, the first extension 384, and the first base 382 together and the second lower member 372, the second extension 394, and the second base 392 together each define a generally C-shaped (e.g., C-shape with curved or rounded corners, C-shape with square corners, U-shape, etc.) section that is configured to receive and help retain a portion of a side or end of adjacent planar members 102 (e.g., a first C-shaped section and a second C-shaped section extending outwardly away from the first C-shaped section). This C-shape also helps couple the support bracket 340 and the planar members 102 together. According to an exemplary embodiment, the C-shaped section has a size and inner profile that is complementary to an outer profile of the planar member 102, such that at least a portion of the planar member 102 can be received and retained within the C-shaped section. According to other exemplary embodiments, the C-shaped section can be configured having a different size and profile to receive other sized planar members (e.g., planar members having different thicknesses, different shapes, etc.). According to other exemplary embodiments, the lower members 362, 372 and the bases 382, 392 may be adjustable relative to the extensions 384, 394, respectively, such that the C-shaped section can receive a variety of different sized planar members (e.g., planar members having different thicknesses, etc.).

Accordingly, the height 384h of each of the extensions 384, 394 (as shown in FIGS. 16-17) is approximately equal to the thickness of the planar member 102 of the bed frame assembly 101. The height 384h may be approximately 1.52 inches according to an exemplary embodiment.

As shown in FIG. 16, the extensions 384, 394 may be configured to offset the connecting structure 360 (in particular the lower members 362, 372) from the bases 382, 392 along the depth of the support bracket 340. Accordingly, rather than extending completely straight up from each of the respective bases 382, 392, the extensions 384, 394 are angled backward, away from the front of the support bracket 340, which positions the connecting structure 360 further back from the bases 382, 382. However, as shown in FIG. 18, the extensions 384, 394 and the bases 382, 392 still partially overlap each other along the depth of the support bracket 340.

The first extension 384 and/or the second extension 394 may include a hole 396 to help create or manufacture the support bracket 340, in particular while powder coating. The diameter of the hole 396 may be approximately 0.19 inches according to an exemplary embodiment.

As shown in FIG. 17, it is understood that the first extension 364, the first lower member 362, the first extension 384, and the first base 382 are mirror opposites to the second extension 374, the second lower member 372, the second extension 394, and the second base 392, individually (respectively) and as a group.

The support bracket 340 may be a unitary member, such that the upper attachment structure 350, the connecting structure 360, and the lower attachment structure 380 are all integrally formed as a portion/part of the same single member. For example, the unitary support bracket 340 may be formed out of a flat blank (e.g., of a steel or other suitable metal) through any suitable forming process, such as a stamping process (e.g., using a progressive die, transfer die, or other suitable process). Utilizing a unitary support bracket 340, advantageously, eliminates/reduces the need for coupling members (e.g., fasteners) and/or coupling processes (e.g., welding (e.g., spot, MIG, TIG, or laser welding, etc.)), and also allows adding notches, holes (e.g., slots), or other useful features easily and inexpensively.

According to other examples, the support bracket 340 may include multiple elements that are coupled together. For example, the upper attachment structure 350, the connecting structure 360, and the lower attachment structure 380 may be separate from one or more of the other of the upper attachment structure 350, the connecting structure 360, and the lower attachment structure 380. The separate elements may be coupled together using a fastener (e.g., bolts, rivets, etc.), a process (e.g., welding (e.g., spot, MIG, TIG, or laser welding, etc.)), a combination thereof, or any other suitable element/process.

Figure 22:
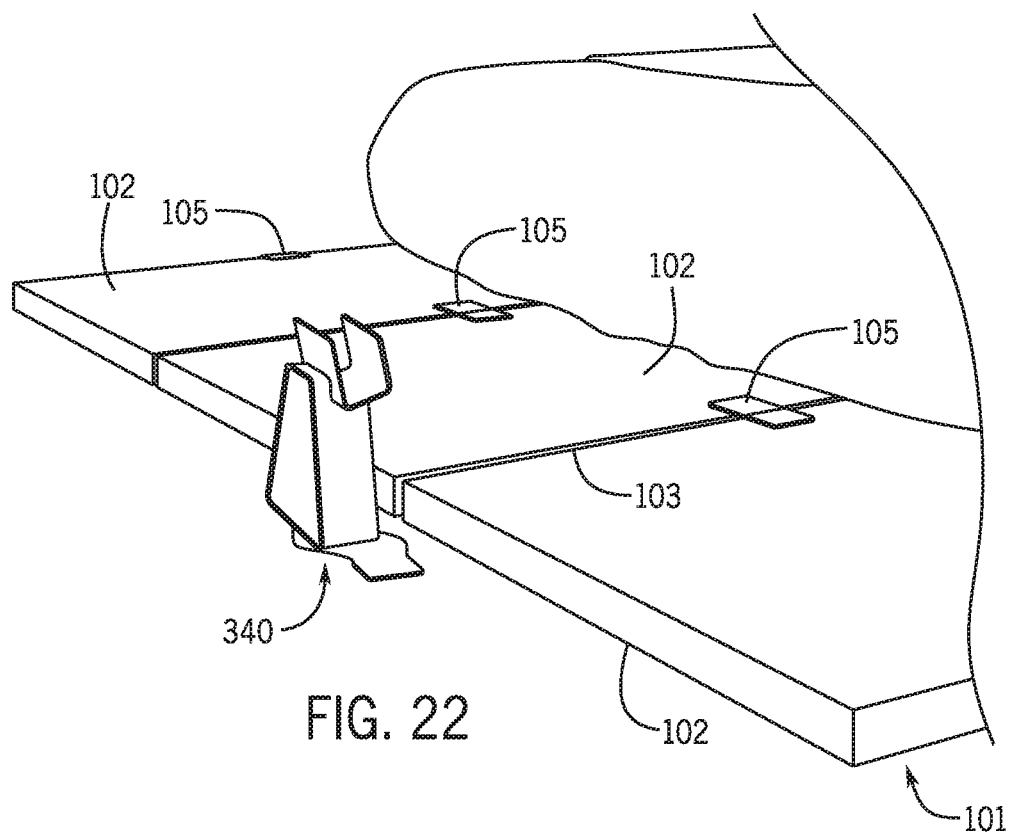
FIGS. 22-25 are perspective views of the headboard assembly of the bed assembly of FIG. 1 being assembled onto the bed frame assembly of the bed assembly of FIG. 1.
Figure 26:
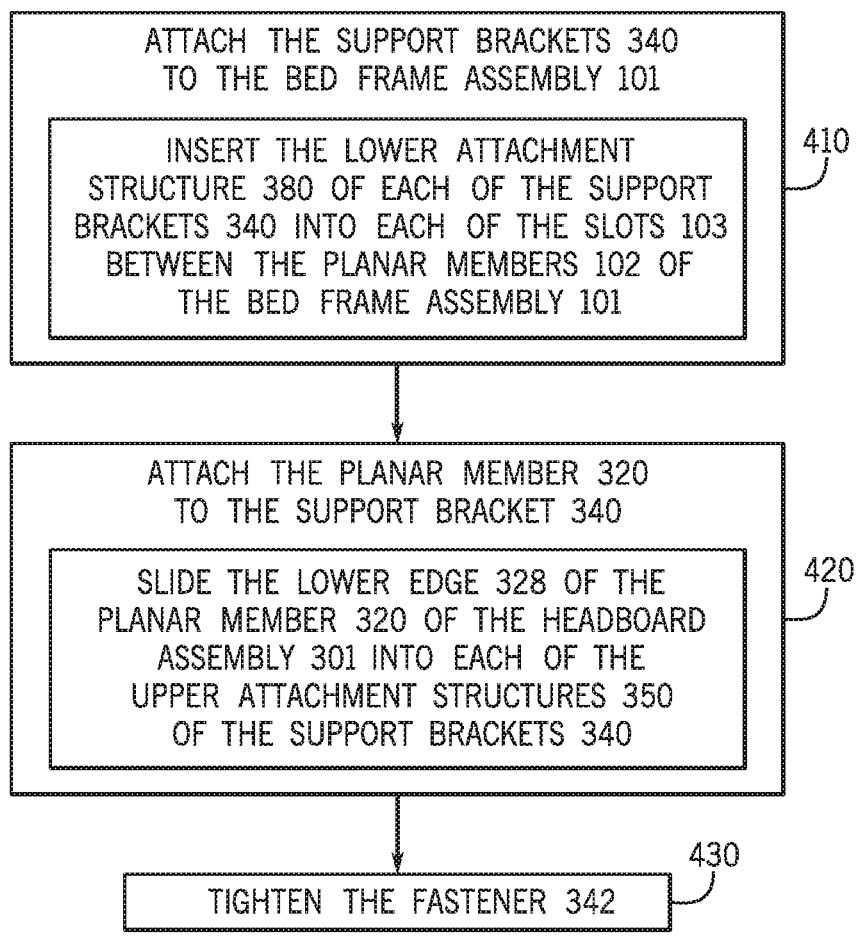
FIG. 26 is a schematic flow diagram illustrating the headboard assembly being assembled onto the bed frame assembly of the bed assembly of FIG. 1.

As shown in FIGS. 22-26, the headboard assembly 301 may be easily assembled to the bed frame assembly 101. First, the support brackets 340 are attached to the bed frame assembly 101 in a step 410, as shown in FIGS. 22 and 26. Accordingly, the lower attachment structure 380 of each of the support brackets 340 is inserted into each of the slots 103 between two adjacent planar members 102 of the bed frame assembly 101. Once the support brackets 340 have been removably coupled to the bed frame assembly 101, the upper attachment structure 350 and the connecting structure 360 are disposed above the planar members 102, the extensions 384, 394 are within the slot 103, and the bases 382, 392 are below the planar members 102.

Figure 23:
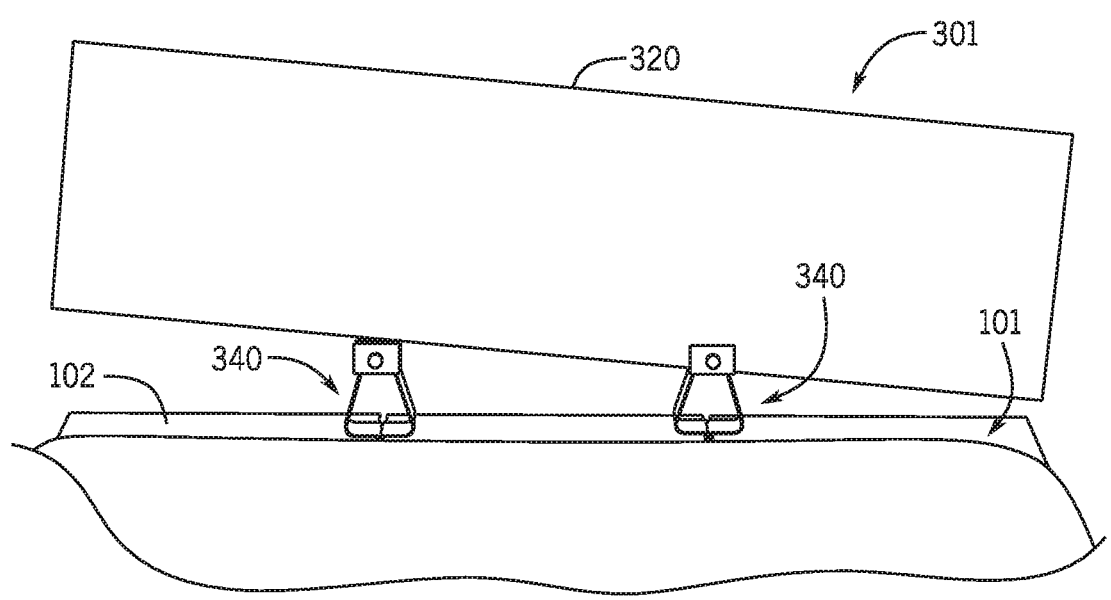
Figure 24:
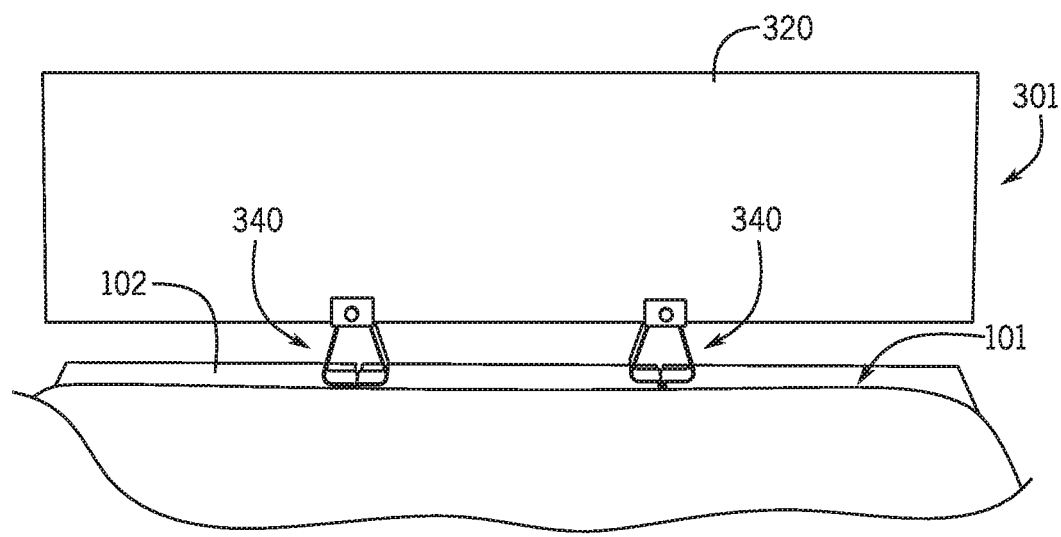
Figure 25:
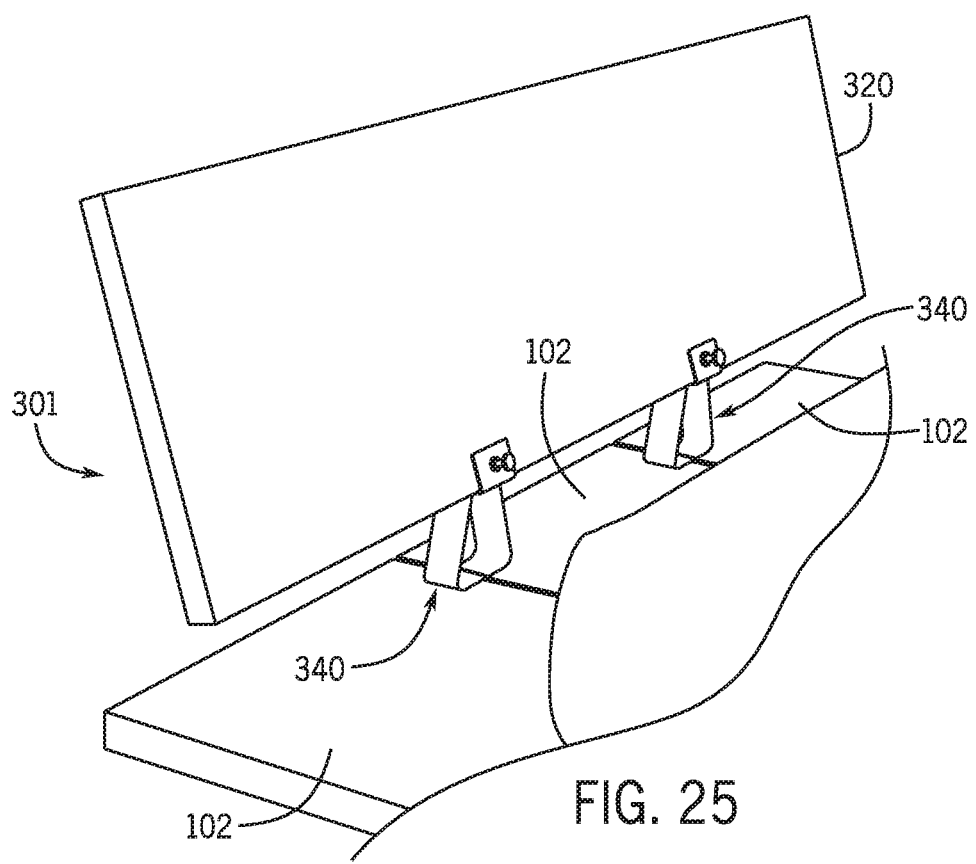

Subsequently, the headboard 320 is removably coupled to the support brackets 340 in a step 420, as shown in FIGS. 23 and 26. Accordingly, the lower edge 328 of the headboard 320 of the headboard assembly 301 is slid or inserted into each of the upper attachment structures 350 of the support brackets 340. Once the headboard 320 has been attached to the support brackets 340, the headboard 320 is on top of the support base 352 and between the extensions 354 and 356.

Optionally and finally, the fastener 342 may be coupled to the headboard 320 in a step 430. Accordingly, the fastener 342 may be, for example, screwed through the nut 359 and inserted into the aperture 358 in the upper attachment structure 350 of the support bracket 340. The fastener 342 is tightened into the front side 322 or the back side 324 of the headboard 320, which further couples the headboard 320 to the support bracket 340. Another fastener 342, or other type of fastener, can be coupled to the lower attachment structure 380 of the support bracket in an additional step. For example, the fastener 342 may be screwed through a nut inserted into an aperture in the lower attachment structure 380 (e.g., through a portion of at least one of the C-shaped sections), so as to couple the lower attachment structure 380 to a planar member 102 of the modular bed frame assembly, similar to the upper attachment structure 350 and the headboard 320. According to an exemplary embodiment, the lower attachment structure 380 includes a plurality of fasteners for coupling to two adjacent planar members 102.

The headboard assembly 301, as disclosed in this application, is modular in nature and is able to be used with a different sized mattress 10 and modular bed frame assemblies 101 by using different sized headboards 320. The headboard assembly 301 is easily assembled and disassembled into relatively small and light weight components that are easily transportable The headboard assembly 301 also is relatively a less complex system, such as to advantageously be assembled and/or disassembled without the need for tools. The headboard assembly 301 also is aesthetically pleasing and may be made from different materials (e.g., woods, metals) to tailor the headboard assembly 301 for individual taste. Another advantage of the headboard assembly 301 is that the headboard assembly 301 is very portable (e.g., easy to move), which makes the headboard assembly 301 particularly advantageous, for example, for people living in cities and moving between residences (e.g., apartments) more frequently. The headboard assembly 301 includes relatively flat, smaller components that further enhance the portability/transportability of the headboard assembly 301. Another advantage of the headboard assembly 301 is that the components of the headboard assembly 301 are easy to replace, in the event that a component of headboard assembly 301 breaks. Yet another advantage is that the support brackets 340 can be used with other materials instead of the headboard 320 (i.e., the support brackets 340 can be sold without the headboard 320 to further reduce the cost of the headboard assembly 301). For example, the support brackets 340 can be assembled with regular plywood, a door, or any other suitable flat member obtained by the customer, such as from a home improvement store.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the headboard assemblies, and components thereof, as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element/component disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A headboard assembly for a modular bed frame assembly, comprising:
   a support bracket including an upper attachment structure and a lower attachment structure;
   a headboard removably coupled to the support bracket at the upper attachment structure;
   wherein the upper attachment structure includes a section for receiving an edge portion of the headboard therein; and
   wherein the support bracket is configured to be removably coupled between two laterally adjacent planar members of the modular bed frame assembly by the lower attachment structure.

2. The headboard assembly of claim 1, wherein the support bracket further includes a connecting structure extending between the upper attachment structure and the lower attachment structure.

3. The headboard assembly of claim 1, wherein the upper attachment structure defines a generally C-shaped section for receiving the edge portion of the headboard therein.

4. The headboard assembly of claim 3, wherein the upper attachment structure includes an opening for receiving a fastener to couple the headboard to the support bracket.

5. The headboard assembly of claim 1, wherein the upper attachment structure is configured to be oriented at an angle of approximately 0-25 degrees relative to a plane defined by the two laterally adjacent planar members of the modular bed frame assembly when the support bracket is coupled between the two laterally adjacent planar members.

6. The headboard assembly of claim 1, wherein the lower attachment structure includes a first C-shaped section configured to receive a portion of one of the two laterally adjacent planar members of the modular bed frame assembly.

7. The headboard assembly of claim 6, wherein the lower attachment structure includes a second C-shaped section extending outwardly away from the first C-shaped section, wherein the second C-shaped section is configured to receive a portion of the other of the two laterally adjacent planar members of the modular bed frame assembly.

8. The headboard assembly of claim 1, wherein the lower attachment structure includes a friction member configured to limit relative movement between the support bracket and the two laterally adjacent planar members.

9. A support bracket for a headboard assembly for a modular bed frame assembly, the support bracket comprising:
   an upper attachment structure including a section configured to receive an edge portion of a headboard therein; and
   a lower attachment structure configured to be inserted between two laterally adjacent planar members of the modular bed frame assembly, so as to receive a portion of each of the two adjacent planar members and removably couple the support bracket to the modular bed frame assembly.

10. The support bracket of claim 9, wherein the support bracket further includes a connecting structure extending between the upper attachment structure and the lower attachment structure.

11. The support bracket of claim 9, wherein the upper attachment structure defines a generally C-shaped section configured to receive the edge portion of the headboard therein.

12. The support bracket of claim 11, wherein the upper attachment structure includes an opening configured to receive a fastener to couple the headboard to the support bracket.

13. The support bracket of claim 9, wherein the upper attachment structure is configured to be oriented at an angle of approximately 0-25 degrees relative to a plane defined by the two laterally adjacent planar members of the modular bed frame assembly when the support bracket is coupled between the two laterally adjacent planar members.

14. The support bracket of claim 9, wherein the lower attachment structure includes a first C-shaped section configured to receive a portion of one of the two laterally adjacent planar members of the modular bed frame assembly.

15. The support bracket of claim 14, wherein the lower attachment structure includes a second C-shaped section extending outwardly away from the first C-shaped section, wherein the second C-shaped section is configured to receive a portion of the other of the two laterally adjacent planar members of the modular bed frame assembly.

16. The support bracket of claim 9, wherein the lower attachment structure includes a friction member configured to limit relative movement between the support bracket and the two adjacent planar members.

17. A method of assembling a headboard assembly to a modular bed frame assembly, comprising:
   inserting a support bracket between two adjacent planar members of the modular bed frame assembly, wherein the support bracket includes a lower attachment structure configured to receive a portion of each of the two adjacent planar members; and
   inserting an edge portion of a headboard into a section of an upper attachment structure of the support bracket.

18. The method of claim 17, further comprising coupling the headboard to the upper attachment structure using a fastener.

19. The method of claim 17, wherein the lower attachment structure includes a first C-shaped section for receiving the portion of one of the two adjacent planar members of the modular bed frame assembly.

20. The method of claim 19, wherein the lower attachment structure further includes a second C-shaped section extending outwardly away from the first C-shaped section for receiving the portion of the other of the two adjacent planar members of the modular bed frame assembly.

* * * * *